(12) United States Patent
Sano

(10) Patent No.: US 7,977,433 B2
(45) Date of Patent: Jul. 12, 2011

(54) FLUORORUBBER COMPOSITION AND PRODUCTION METHOD OF CROSS-LINKED FLUORORUBBER PRODUCT

(75) Inventor: Hiroyuki Sano, Fujisawa (JP)

(73) Assignee: Nok Corporation, Tokyo (JP)

( * ) Notice: Subject to any disclaimer, the term of this patent is extended or adjusted under 35 U.S.C. 154(b) by 9 days.

(21) Appl. No.: 12/093,550

(22) PCT Filed: Oct. 16, 2006

(86) PCT No.: PCT/JP2006/320584
§ 371 (c)(1),
(2), (4) Date: May 13, 2008

(87) PCT Pub. No.: WO2007/058038
PCT Pub. Date: May 24, 2007

(65) Prior Publication Data
US 2009/0163671 A1    Jun. 25, 2009

(30) Foreign Application Priority Data

Nov. 16, 2005    (JP) .................................. 2005-332035

(51) Int. Cl.
*C08F 14/18*    (2006.01)
*C08F 8/00*    (2006.01)

(52) U.S. Cl. .................. 525/326.2; 525/326.3; 526/247; 526/249; 526/253; 526/254; 526/255; 528/481; 528/503

(58) Field of Classification Search ............... 525/326.2, 525/326.3; 528/481, 503
See application file for complete search history.

(56) References Cited

U.S. PATENT DOCUMENTS

| | | | |
|---|---|---|---|
| 3,864,298 A * | 2/1975 | Kometani et al. ............. | 524/105 |
| 4,496,682 A | 1/1985 | Schmiegel | |
| 4,957,975 A * | 9/1990 | Carlson et al. ................ | 525/340 |
| 7,279,530 B2 | 10/2007 | Higashira et al. | |

FOREIGN PATENT DOCUMENTS

| | | | |
|---|---|---|---|
| DE | 3915318 A | * | 12/1989 |
| JP | 59232137 | | 12/1984 |
| JP | 1306454 | | 12/1989 |
| JP | 2209942 | | 8/1990 |
| JP | 3234752 | | 10/1991 |
| JP | 1072542 | | 3/1998 |
| JP | 2000212361 | | 8/2000 |
| JP | 2002363368 | | 12/2002 |
| WO | 2004094479 | | 11/2004 |

OTHER PUBLICATIONS

Machine translation of Sonoi et al., DE 3915318 A, retrieved Mar. 2, 2010.*
Translation of Sonoi et al., JP 3915318, Aug. 2010.*
Translation of Sonoi et al., DE 3915318, Aug. 2010.*

* cited by examiner

*Primary Examiner* — Mark Eashoo
*Assistant Examiner* — Nicole M Buie-Hatcher
(74) *Attorney, Agent, or Firm* — K. David Crockett, Esq.; Niky Economy Syrengelas, Esq.; Crockett & Crockett, PC

(57) ABSTRACT

A fluororubber composition including a polyol-crosslinkable fluororubber; a cross-linking accelerator comprising a quaternary ammonium salt; and a polyol crosslinking agent; wherein the weight ratio X (quaternary ammonium salt/polyol crosslinking agent) between the cross-linking accelerator and the polyol crosslinking agent is in a range of 0.40 to 0.60; and a production method of a cross-linked fluororubber product, comprising the steps of: previously polyol-crosslinking, as required, the fluororubber composition; and subsequently heat treating the polyol-crosslinked composition, in a temperature range of 200° C. to 300° C. for 0.1 to 48 hours. The fluororubber composition has surface has a lower friction coefficient, and the surface roughness of the cross-linked fluororubber product can be increased without applying a treatment to a mold.

1 Claim, No Drawings

FLUORORUBBER COMPOSITION AND PRODUCTION METHOD OF CROSS-LINKED FLUORORUBBER PRODUCT

TECHNICAL FIELD

The present invention relates to a fluororubber composition and a production method of a cross-linked fluororubber product, and particularly to a fluororubber composition and a production method of a cross-linked fluororubber product, capable of achieving a fluororubber surface having a lower friction coefficient, and capable of increasing a surface roughness of the cross-linked fluororubber product without applying a treatment to a mold.

BACKGROUND ART

Conventionally, fluororubbers possess rubber elasticity inherent in rubber similarly to other general-purpose rubbers and are superior in properties such as heat resistance, oil resistance, and chemical resistance as compared to other general-purpose rubbers, so that fluororubbers are used in various applications by taking advantage of such properties, in a manner that fluororubbers are used as: leak-proof rubber parts represented by O-rings, packings and gaskets; vibration-proof rubbers; belts; rubbers in rubber coated fabrics; and impact absorption stopper parts such as for printer heads, and for head controllers of hard disks (HDD), and more concretely, stoppers placed for the purpose of exemplarily preventing malfunctions of readout arms within HDD devices.

Such conventional fluororubbers are tacky at rubber surfaces and have high friction coefficients, and thus may require an anti-tack treatment for cross-linked rubber surfaces upon production thereof. However, the anti-tack treatment problematically increases production costs Further, exemplarily using conventional fluororubbers as stoppers of storage devices of hard disks (HDD), suffer from malfunctions due to adhesion between stoppers and arms. Moreover, damping properties of conventional fluororubbers largely depend on temperature such that rebound resilience is large at high temperature, thereby problematically failing to absorb vibrations of arms.

Herein, the "stoppers" are parts each provided for the purpose of: defining a limit position (arm swung position) of a movable range of a record/readout head portion provided at an end of an arm where the arm is kept stand-by; and absorbing impacts in order to restrict malfunctions of the arm after operations or during stand-by thereof.

Recently and increasingly used as such stoppers are those of a magnet-older type each including a magnet incorporated into a rubber to fix an arm by a magnetic force, and those of crush-stop type each including stoppers arranged at opposite sides of an arm, respectively. These stoppers require capabilities, mainly represented by the following three items:

(1) Excellence in impact absorbability upon collision of arm;

(2) Free of adhesion between the rubber and the arm, though the rubber and an end (made of metal) of the arm are required to be pressurized to each other by magnetic force or the like during stand-by of the arm; and (3) Cleanliness.

Adopting conventional fluororubbers is less problematic in terms of (1) impact absorbability and (3) cleanliness, but problematically leads to failure of satisfaction of the required capability (2) due to larger tackiness.

Disclosed in WO2004/094479 A1 is a technique, in which an addition ratio (cross-linking accelerator/crosslinking agent) between a quaternary phosphonium salt as a cross-linking accelerator and a crosslinking agent both to be blended in a fluororubber composition is set to be between 0.9 inclusive and 5 inclusive, in a manner to adopt the addition ratio larger than those in conventional fluororubber compositions, thereby allowing a lower friction of a rubber surface. The thus lowered friction modifies a rubber surface state, thereby realizing a decreased friction coefficient, i.e., a lower tackiness.

However, although the fluororubber composition described in the patent-related reference 1 leads to a surface having a decreased friction coefficient in itself, the surface keeps a flat and smooth state, resulting in that the composition is combined with a procedure to further roughen a surface state such as by applying a satin like treatment to a mold upon practical use.

It is therefore an object of the present invention to provide a polyol-crosslinking fluororubber composition and a production method of a cross-linked fluororubber product, capable of achieving a fluororubber surface having a lower friction coefficient, and capable of increasing a surface roughness of the cross-linked fluororubber product without applying a treatment to a mold.

Other objects of the present invention will become apparent from the following description.

DISCLOSURE OF INVENTION

The objects are solved by the following inventions:

The invention recited in claim 1 resides in a fluororubber composition comprising:
 a polyol-crosslinkable fluororubber;
 a cross-linking accelerator comprising a quaternary ammonium salt; and
 a polyol crosslinking agent;
 wherein the weight ratio X (quaternary ammonium salt/polyol crosslinking agent) between the cross-linking accelerator and the polyol crosslinking agent is in a range of 0.40 to 0.60.

The invention recited in claim 2 resides in the fluororubber composition of claim 1, wherein the fluororubber composition is used for preparing a polyol-crosslinked fluororubber product.

The invention recited in claim 3 resides in a production method of a cross-linked fluororubber product, comprising the steps of:
 previously polyol-crosslinking, as required:
 a fluororubber composition comprising:
 a polyol-crosslinkable fluororubber;
 a cross-linking accelerator comprising a quaternary ammonium salt; and
 a polyol crosslinking agent;
 wherein the weight ratio X (quaternary ammonium salt/polyol crosslinking agent) between the cross-linking accelerator and the polyol crosslinking agent is in a range of 0.40 to 0.60; and
 subsequently heat treating the polyol-crosslinked composition, in a temperature range of 200° C. to 300° C. for 0.1 to 48 hours.

The invention recited in claim 4 resides in the production method of cross-linked fluororubber product of claim 3, wherein the cross-linked fluororubber product has a dynamic friction coefficient of 0.5 or less, a surface roughness (Ra) of 1.5 or more, and a surface roughness (Ry) of 10 or more.

The invention recited in claim 5 resides in the production method of a cross-linked fluororubber product of claim 4, wherein the dynamic friction coefficient of the cross-linked fluororubber product is 0.1 to 0.4.

The invention recited in claim 6 resides in the production method of a cross-linked fluororubber product of claim 4 or 5, wherein the surface roughness (Ra) of the cross-linked fluororubber product is in a range of 1.5 to 4.0 and the surface roughness (Ry) is in range of 10 to 25.

EFFECTS OF THE INVENTION

According to the present invention, there is modified a fluororubber surface by virtue of a blending technique, thereby allowing the surface to be roughened even without applying a satin-like treatment to the mold, and thus enabling simplification of a process directed to a lower tackiness.

BEST MODE FOR CARRYING OUT THE INVENTION

Preferred embodiments of the present invention will be explained hereinafter.

(Fluororubber Composition)

The fluororubber composition of the present invention contains at least: a polyol-crosslinkable fluororubber, a cross-linking accelerator comprising a quaternary ammonium salt, and a polyol crosslinking agent.

<Polyol-Crosslinkable Fluororubber>

Usable as a polyol-crosslinkable fluororubber (polyol-crosslinking fluororubber) is a polymer or copolymer of one kind or two or more kinds of fluorine-containing olefins.

Examples of fluorine-containing olefin concretely include vinylidene fluoride, hexafluoropropylene, pentafluoropropylene, trifluoroethylene, trifluorochloroethylene, tetrafluoroethylene, vinyl fluoride, perfluoroacrylic esters, perfluoroalkyl acrylates, perfluoromethyl vinyl ether, and perfluoropropyl vinyl ether.

These fluorine-containing olefins may also be used in one kind or combinedly in two or more kinds.

Examples of such polyol-crosslinking fluororubber preferably include vinylidene fluoride/hexafluoropropylene binary copolymer (abbreviation: VDF-HFP), tetrafluoroethylene/propylene binary copolymer (abbreviation: TFE-P), vinylidene fluoride/hexafluoropropylene/tetrafluoroethylene ternary copolymer (abbreviation: VDF-HFP-TFE), which are available as commercial products, respectively.

<Polyol Crosslinking Agent>

Desirable as a polyol crosslinking agent is one of bisphenols. Concretely, examples thereof include polyhydroxy aromatic compounds such as 2,2-bis(4-hydroxyphenyl)propane [bisphenol A], 2,2-bis(4-hydroxyphenyl)perfluoropropane [bisphenol AF], bis(4-hydroxyphenyl)sulfone [bisphenol S], bisphenol A-bis(diphenyl phosphate), 4,4'-dihydroxydiphenyl, 4,4'-dihydroxydiphenyl methane, and 2,2-bis(4-hydroxyphenyl)butane, and desirably usable are bisphenol A, bisphenol AF, and the like. They may be each in a form of alkali metal salts or alkaline earth metal salts.

Further, usable as the polyol crosslinking agent is a commercially available master batch containing a stock rubber and a polyol crosslinking agent. Examples of commercially available master batches include CURATIVE VC #30 (manufactured by DuPont Dow Elastomers, containing 50 wt % of crosslinking agent [bisphenol AF]). These crosslinking agents may be used in one kind or combinedly in two or more kinds.

<Cross-Linking Accelerator>

Usable as the quaternary ammonium salt used as the cross-linking accelerator in the present invention, is a compound (hereinafter called a "quaternary ammonium salt of the present invention") represented by the following general formula (1):

[Chemical Formula I]

$$\left[\begin{array}{c} R \\ | \\ N^+ \\ \diagup \diagdown \\ \phantom{xx} N \end{array}\right] X^-$$

In the general formula, R represents an alkyl group having a carbon number of 1 to 24 or an aralkyl group having a carbon number of 7 to 20, and $X^-$ represents a tetrafluoroborate group or a hexafluorophosphate group.

Desirable as the quaternary ammonium salt of the present invention is a compound where the R is a benzyl group, and examples of the compound include 5-benzyl-1,5-diazabicyclo[4.3.0]-5-nonenium tetrafluoroborate (abbreviation: DBN-F), and hexafluorophosphate (abbreviation: DBN-P).

The tetrafluoroborate and hexafluorophosphate have melting points of about 80° C. and 100° C., respectively, and are excellent in dispersibility in that they easily melt upon heated kneading (100° C.) by a roll, a kneader, a Banbury mixer, or the like.

As the quaternary ammonium salt of the present invention, it is possible to use a commercially available master batch containing a stock rubber and a quaternary ammonium salt.

Although there has been conventionally proposed a technique to contain a layered compound treated with a quaternary ammonium salt into a fluororubber composition, the treated compound fails to exhibit a cross-linking accelerating function when used combinedly with a polyol crosslinking agent. Thus, the quaternary ammonium salt of the present invention contains no layered compounds treated with a quaternary ammonium salt.

<Other Blending Components>

In the present invention, in addition to the above-described components, it is possible to add, as rubber blending ingredients and as required, those blending ingredients typically used in a rubber industry, in a range without deteriorating the effects of the crosslinking agent and cross-linking accelerator used in the present invention, such as: a reinforcing agent such as carbon black, carbon fiber, and the like; a filler such as hydrotalcite ($Mg_6Al_2(OH)_{16}CO_3$), calcium carbonate, magnesium carbonate, aluminum hydroxide, magnesium hydroxide, aluminum silicate, magnesium silicate, calcium silicate, potassium titanate, titanium oxide, barium sulfate, aluminum borate, glass fiber, aramid fiber, and the like; a processing aid such as wax, metallic soap, and the like; an acid acceptor such as calcium hydroxide, magnesium oxide, and zinc oxide; an antioxidant; and a thermoplastic resins.

Among them, calcium hydroxide is preferably usable in appropriately adjusting a cross-linking density, is desirable in exemplarily lowering a friction coefficient of a cross-linked fluororubber product and obtaining a lower rebound resilience, and is desirable in that foaming is scarcely caused upon molding. It is also desirable to use magnesium oxide in obtaining a lower rebound resilience of a cross-linked fluororubber product, or in obtaining a lower friction coefficient and a lower adhesive force.

<Blending Ratio>

In the present invention, the weight ratio X (quaternary ammonium salt compound/polyol crosslinking agent)

between the quaternary ammonium salt of the present invention and the polyol crosslinking agent is in a range of 0.40 to 0.60.

Weight ratios X less than 0.40 make it difficult to achieve decreased friction coefficients of surfaces of cross-linked fluororubber products, and weight ratios X exceeding 0.60 enable achievement of decreased friction coefficients of surfaces of cross-linked fluororubber products to a certain extent but exemplarily cause increased hardness and deteriorated ultimate elongation as cross-linked fluororubber products, thereby deteriorating physical properties in ordinary states and thus becoming impractical.

The blending amount of the cross-linking accelerator (quaternary ammonium salt compound) of the fluororubber composition is preferably in a range of 0.95 to 20 parts by weight, and more preferably 1.0 to 10 parts by weight relative to 100 parts by weight of a polyol-crosslinkable fluororubber.

Typically, the polyol crosslinking agent (preferably bisphenols) is in a range of 0.4 to 20 parts by weight, and more preferably 1 to 10 parts by weight relative to 100 parts by weight of a polyol-crosslinkable fluororubber.

<Preparation>

Examples of methods for preparing the polyol-crosslinkable fluororubber composition according to the present invention include: a method for kneading the predetermined amounts of the above-described components, by a closed kneader such as an intermix, kneader, Banbury mixer, or the like, or by a typical kneader for rubber such as an open roll; and a method for dissolving each components by a solvent and dispersing it by a stirring machine.

[Production Method of Cross-Linked Fluororubber Product]

<Primary Vulcanization (Cross-Linking)>

The fluororubber composition obtained in the above manner can be cross-linkedly (vulcanizedly) molded, by heating (primary vulcanization) thereof typically at a temperature of 140° C. to 230° C. for 1 to 120 minutes by an injection molding machine, compression molding machine, vulcanizing press, oven, or the like.

Note that the primary vulcanization is a step for causing a composition to be cross-linked to an extent that a certain shape can be kept in order to form (or pre-form) a target shape, and in case of a complicated shape, it is possible to conduct primary vulcanization by causing a composition to be shaped desirably by a mold and then exemplarily subjected to air heating in an oven.

In compression molding a processed fluororubber composition after kneading it in the present invention, it is typically possible to (a) once bring back the composition to an ordinary temperature after kneading, and to subsequently compression mold it by raising the temperature thereof, or (b) directly and continuously raise the temperature of the composition after kneading, thereby compression molding it. Typically, the procedure (a) is adopted in a compressing step by a compression molding machine, in a manner suitable for the step.

Further, in producing fluororubber molded articles such as rubber hoses, it is possible to extrude a fluororubber composition into a tube shape after kneading the composition and directly perform oven vulcanization, and the procedure (b) is adopted then.

Bringing the fluororubber composition into a certain shape before vulcanization allows obtainment of a molded article of low friction and low tackiness by either of the procedure (a) or (b). Levels of low tackiness of obtained cross-linked fluororubber products are affected not by details of preceding temperature rising patterns or temperature rising curves for heat treatment, but by temperatures and times of heat treatments.

<Heat Treatment>

The heat treatment method of the present invention is the same as ordinary secondary vulcanization. However, without adopting the fluororubber composition (polyol cross-linking fluororesin composition) of the present invention, it is impossible to obtain a cross-linked fluororubber product having a dynamic friction coefficient of 0.5 or less, surface roughness (Ra) of 1.5 or more, and a surface roughness (Ry) of 10 or more even by conducting ordinary secondary vulcanization.

Secondary vulcanization in conventional fluororubbers is conducted for the purpose of completing a cross-linking reaction insufficient by primary vulcanization, or gasifying low molecular components in the rubber for enhanced strength and decreased compression set. However, unlike the conventional, the present invention modify a fluororubber surface by virtue of a blending technique by limiting a weight ratio X (quaternary ammonium salt compound/polyol crosslinking agent) between the quaternary ammonium salt and a polyol crosslinking agent to a particular range such as between 0.40 and 0.60, thereby enabling to roughen a surface even without a treatment such as satin like treatment to a mold, thereby achieving simplification of a process directed to a lower tackiness.

As the heat treatment after primary vulcanization in the present invention, the fluororubber composition of the present invention is heat-treated in a temperature range of 200° C. to 300° C., desirably 240° C. to 260° C., for 0.1 to 48 hours, preferably 1 to 48 hours, and more preferably 10 to 48 hours.

Heat treating the composition in this way causes the cross-linking accelerator component and the like in the composition to be progressively migrated from the interior of the composition to a composition surface layer as a part adjacent to the surface of the composition, in a manner to enhance a cross-linking density of the surface layer (an area from the surface of the composition inclusive deeply to an interior thereof at a distance of about 100 μm from the composition surface) as compared to the interior (particularly the center) of the composition, resulting in that the cross-linked product obtained by heat treating in this way is enabled to realize a surface thereof having a low friction, a low tackiness, and due surface roughness. Further, setting the heat treatment condition in the above manner is desirable in that the surface of the obtained cross-linked fluororubber product is particularly excellent in anti-tack property and excellent in stability of the anti-tack property.

In this respect, adopting a layered compound treated with a quaternary ammonium salt in a conventional manner restricts migration of the quaternary ammonium salt as the cross-linking accelerator component in a composition in a manner to fail to exhibit a cross-linking accelerating function like the present invention and fail to expect improvement of a cross-linking density of a surface layer, resulting in that it is also difficult for the cross-linked product obtained by heat treatment to possess a low friction, a low tackiness, and a due surface roughness. Based on such a reason, the quaternary ammonium salt of the present invention does not contain a layered compound treated with a quaternary ammonium salt.

According to the present invention, conducting the above-mentioned heat treatment allows obtainment of a cross-linked fluororubber product of low friction such that the cross-linked product surface has a dynamic friction coefficient of 0.5 or less, and desirably 0.1 to 0.4.

The dynamic friction coefficient was measured in a manner to measure a dynamic friction coefficient of a sample rubber sheet having a thickness of 2 mm by a surface tester manufactured by SHINTO SCIENTIFIC Co., Ltd., in conformity to JIS K7125, P 8147.

Conducting the heat treatment for the composition allows for realization of a desired surface roughness. Namely, the cross-linked fluororubber product of low friction is rendered to have a surface roughness (Ra) of 1.5 or more and a surface roughness (Ry) of 10 or more, preferably a surface roughness (Ra) of 1.5 to 4.0 and a surface roughness (Ry) of 10 to 25, thereby enabling realization of a surface roughness equivalent to or superior to that of a cross-linked product adopting a mold subjected to a satin like treatment.

Note that, from a standpoint of avoiding occurrence (outgassing) of low molecular volatile components in the present invention, it is possible that, after previous polyol cross-linking (vulcanizing) of the polyol-crosslinkable fluororubber composition in the above manner, the resultingly obtained composition may be heat-treated in a temperature range of 200° C. to 300° C. in the above manner, preferably 240° C. to 260° C., for 0.1 to 48 hours, preferably 1 to 48 hours, and more preferably 10 to 48 hours.

If a composition has excessive amounts of low molecular volatile substances (outgassing), and when the product therefrom is utilized as a stopper for an HDD device or the like, there is caused a problem of contamination of a metal part such as a disk due to low molecular components generated from the composition, so that the heat treatment such as conducted in the present invention is desirable, and higher temperatures for heat treatment and longer hours for heat treatment are desirable.

EXAMPLES

Although the present invention will be explained with respect to Examples, the present invention is never limited to such Examples.

Example 1

<Blending Components and Blending Amounts>
(1) Polyol-Crosslinkable Fluororubber:
("Viton A500" manufactured by DuPont Dow Elastomers: polyol-vulcanizing type, Mooney viscosity $ML_{1+10}$ (121° C.): 45) . . . 100 parts by weight
(2) MT Carbon:
("Huber N-990" manufactured by Huber, averaged particle diameter: 500 μm, specific surface area: 6 m²/g) . . . 5 parts by weight
(3) Hydrotalcite:
("DHT-4A" manufactured by Kyowa Chemical Industry Co., Ltd.) . . . 2 parts by weight
(4) Calcium Hydroxide:
("CALDIC #2000" manufactured by Ohmi Chemical Industry, Ltd.) . . . 3 parts by weight
(5) Crosslinking Agent:
Master batch of Bisphenol AF ("CURATIVE VC #30": manufactured by DuPont Dow Elastomers): 50 wt %, and fluororubber "Viton E-45": manufactured by DuPont Dow Elastomers: 50 wt % . . . 4.6 parts by weight (note: delivery at roll)
(6) Cross-Linking Accelerator:
5-benzyl-1,5-diazabicyclo[4.3.0]-5-nonenium tetrafluoroborate . . . 1.0 part by weight (note: delivery at roll)

<Preparation, Vulcanization, and Heat Treatment>
The blending components noted above (except for vulcanizing component) were delivered into a kneader and kneaded for 20 minutes, followed by delivery of a vulcanizing component at an open roll, thereby preparing a composition.

The composition was pressurized and vulcanized at 170° C. for 20 minutes to mold a vulcanized article, followed by a further heat treatment at 260° C. for 10 hours.

The thus heat-treated article was measured for dynamic friction coefficient, surface roughness, rubber hardness, tensile strength, and ultimate elongation.

The result is shown in Table 1
<Measuring Method>
Dynamic Friction Coefficient (μ):
Measurement of dynamic friction coefficient was conducted in a manner to measure a dynamic friction coefficient of a surface of sample rubber sheet having a thickness of 2 mm by a surface tester manufactured by SHINTO SCIENTIFIC Co., Ltd., in conformity to JIS K7125, P 8147. The measurement was conducted under a condition that the opposite material was a friction piece comprising a chromium-plated steel ball having a diameter of 10 mm, the moving rate was 50 mm/min, and the load was 50 g.

Surface Roughness: Conformed to JIS B-0601
Rubber Hardness:
Measured by a Type A durometer, in conformity to JIS K6253. Typically, 40 to 85 (point) is desirable, and 60 to 80 (point) is more preferable.
Tensile strength: conformed to JIS K6251. 5 to 15 MPa is desirable.
Ultimate elongation: conformed to JIS K6251 (measured at 23±3° C.).
<Evaluation>
From Table 1, it is understood that the combination of bisphenol AF and quaternary ammonium salt simultaneously establishes a decreased friction coefficient and a due surface roughness (1.5 or more).

Example 2

There was obtained a heat-treated article, except that the same blending components as Example 1 were changed in blending amount as listed in Table 1, and that the blending ratio of the cross-linking accelerator to the cross-linking agent was changed to a value listed in Table 1, followed by measurement of dynamic friction coefficient, surface roughness, rubber hardness, tensile strength, and ultimate elongation.

The result is shown in Table 1.

As a result and as listed in Table 1, it is understood that the combination of bisphenol AF and quaternary ammonium salt simultaneously establishes a decreased friction coefficient and a due surface roughness (1.5 or more).

Example 3

There was obtained a heat-treated article, except that the same blending components as Example 1 were changed in blending amount as listed in Table 1, and that the blending ratio of the cross-linking accelerator to the cross-linking agent was changed to a value listed in Table 1, followed by measurement of dynamic friction coefficient, surface roughness, rubber hardness, tensile strength, and ultimate elongation.

The result is shown in Table 1.

As a result and as listed in Table 1, it is understood that the combination of bisphenol AF and quaternary ammonium salt simultaneously establishes a decreased friction coefficient and a due surface roughness (1.5 or more).

Comparative Example 1

<Blending Components and Blending Amounts>
The same blending components as Example 1 were adopted, except that magnesium oxide ("Kyowa Mag #150" manufactured by Kyowa Chemical Industry Co., Ltd.) was used instead of hydrotalcite, and the quaternary phosphonium salt was used instead of the quaternary ammonium salt. Further, the blending amounts of the components and the blending ratio of the cross-linking accelerator to the crosslinking agent were changed as listed in Table 1.
Quaternary Phosphonium Salt:
Master batch of "CURATIVE VC #20" manufactured by DuPont Dow Elastomers: 33 wt %, and a fluororubber (Viton E45: manufactured by DuPont Dow Elastomers): 67 wt %
<Measuring Method and Result>
The result is shown in Table 1, in the same manner as Example 1.
<Evaluation>
From Table 1, it is understood that although the combination of bisphenol AF and quaternary phosphonium salt simultaneously establishes a decreased friction coefficient, the surface roughness is unchanged to be that of a flat and smooth surface.

Comparative Example 2

There was obtained a heat-treated article, except that the same blending components as Example 1 were changed in blending amount as listed in Table 1, and that the blending ratio of the cross-linking accelerator to the crosslinking agent was changed to a value listed in Table 1, followed by measurement of dynamic friction coefficient, surface roughness, rubber hardness, tensile strength, and ultimate elongation. The result is shown in Table 1.
As seen from Table 1, even the combination of bisphenol AF and quaternary ammonium salt fails to exhibit an effect of low friction, due to a smaller blending amount of the ammonium salt.

Comparative Example 3

There was obtained a heat-treated article, except that the same blending components as Example 1 were changed in blending amount as listed in Table 1, and that the blending ratio of the cross-linking accelerator to the crosslinking agent was changed to a value listed in Table 1, followed by measurement of dynamic friction coefficient, surface roughness, rubber hardness, tensile strength, and ultimate elongation. The result is shown in Table 1.
As seen from Table 1, although the combination of bisphenol AF and quaternary ammonium salt exhibits a slight effect of low friction, the surface roughness is unchanged to be that of a flat and smooth surface, due to a smaller blending amount of the ammonium salt.

Comparative Example 4

There was obtained a heat-treated article, except that the same blending components as Example 1 were changed in blending amount as listed in Table 1, and that the blending ratio of the cross-linking accelerator to the crosslinking agent was changed to a value listed in Table 1, followed by measurement of dynamic friction coefficient, surface roughness, rubber hardness, tensile strength, and ultimate elongation. The result is shown in Table 1.
As seen from Table 1, even the combination of bisphenol AF and quaternary ammonium salt fails to obtain a sufficient function, due to a slightly small blending amount of the ammonium salt.

Comparative Example 5

There was obtained a heat-treated article, except that the same blending components as Example 1 were changed in blending amount as listed in Table 1, and that the blending ratio of the cross-linking accelerator to the crosslinking agent was changed to a value listed in Table 1, followed by measurement of dynamic friction coefficient, surface roughness, rubber hardness, tensile strength, and ultimate elongation. The result is shown in Table 1.
As seen from Table 1, even when the weight ratio of the cross-linking accelerator to the polyol crosslinking agent is within the range of the present invention, the combination of bisphenol AF and quaternary phosphonium salt fails to exhibit an effect of low friction, and the surface roughness is unchanged to be that of a flat and smooth surface.

TABLE 1

|  | Ex. 1 | Ex. 2 | Ex. 3 | Com. Ex. 1 | Com. Ex. 2 | Com. Ex. 3 | Com. Ex. 4 | Com. Ex. 5 |
|---|---|---|---|---|---|---|---|---|
| Fluororubber (Viton A500 manufactured by DuPont) | 100 | 100 | 100 | 100 | 100 | 100 | 100 | 100 |
| MT carbon | 5 | 5 | 5 | 5 | 5 | 5 | 5 | 5 |
| Hydrotalcite (DHT-4A) | 2 | 2 | 2 |  | 2 | 2 | 2 |  |
| Magnesium oxide |  |  |  | 3 |  |  |  | 3 |
| Calcium hydroxide | 3 | 3 | 3 | 3 | 3 | 3 | 3 | 3 |
| Bisphenol AF | 4.6 | 4.6 | 4.6 | 4.6 | 4.6 | 4.6 | 4.6 | 4.6 |
| Quaternary ammonium salt (5-benzyl-1,5-diazabicyclo[4.3.0]-5-nonenium tetrafluoroborate) | 1.0 | 1.1 | 1.3 | — | 0.5 | 0.7 | 0.9 | — |
| Quaternary phosphonium salt (triphenylbenzyl-phosphonium chloride): curative #20 | — | — | — | 8 | — | — | — | 4 |
| Cross-linking accelerator/Cross-linking agent (active ingredient) (weight ratio) | 0.43 | 0.48 | 0.57 | 1.15 | 0.22 | 0.30 | 0.39 | 0.58 |
| Molding condition (° C./min) | 170/20 | 170/20 | 170/20 | 170/20 | 170/20 | 170/20 | 170/20 | 170/20 |
| Oven heat treatment condition (° C./hrs) | 260/10 | 260/10 | 260/10 | 260/10 | 260/10 | 260/10 | 260/10 | 260/10 |

TABLE 1-continued

|  | Ex. 1 | Ex. 2 | Ex. 3 | Com. Ex. 1 | Com. Ex. 2 | Com. Ex. 3 | Com. Ex. 4 | Com. Ex. 5 |
|---|---|---|---|---|---|---|---|---|
| Dynamic friction coefficient ($\mu$) | 0.4 | 0.4 | 0.3 | 0.3 | 2.5 | 0.6 | 0.4 | 2.2 |
| Surface roughness (Ra) ($\mu$m) | 1.8 | 3.3 | 3.8 | 0.4 | 0.4 | 0.5 | 1.4 | 0.4 |
| Surface roughness (Ry) ($\mu$m) | 11.1 | 15.8 | 20.8 | 3.5 | 3.7 | 4.5 | 8.4 | 2.8 |
| Rubber hardness | 66 | 66 | 69 | 64 | 64 | 65 | 65 | 63 |
| Tensile strength (MPa) | 8.99 | 8.45 | 8.74 | 9.54 | 9.45 | 9.15 | 9.09 | 9.80 |
| Ultimate elongation (%) | 250 | 240 | 230 | 300 | 290 | 280 | 270 | 310 |

(Usage of Cross-Linked Fluororubber Product)

The cross-linked fluororubber product of low friction obtained in the above manner simultaneously possesses a decreased friction coefficient and a due surface roughness (1.5 or more), so that the cross-linked product is preferably usable as: impact absorption stopper parts for hard disk (HDD) storage heads, HDD device stoppers, storage heads in vehicular disk device utilizing an optical disk or the like, video recorder disk device built in cameras, and the like, and printer heads, and the like; various leakproof rubber parts against fluids (including gases and the like) such as O-ring, packing, V-packing, oil seal, gasket, square ring, D-ring, diaphragm, and various valves; and various rubber parts such as vibration-proof rubber, belt, rubber in rubber coated fabric, and wiper.

The invention claimed is:

1. A production method of a cross-linked fluororubber product, comprising the steps of:
   previously polyol-crosslinking, as required:
      a fluororubber composition comprising:
      a polyol-crosslinkable fluororubber;
      a cross-linking accelerator comprising a quaternary ammonium salt with the general formula:

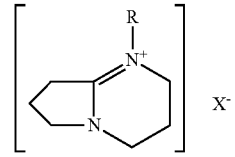

where R represents an alkyl group having a carbon number of 1 to 24 or an aralkyl group having a carbon number of 7 to 20, and X⁻ represents a tetrafluoroborate group; and
a polyol crosslinking agent;
wherein the weight ratio of the cross-linking accelerator to the polyol crosslinking agent is in a range of 0.43 to 0.57; and
subsequently heat treating the polyol-crosslinked composition, in a temperature range of 240 to ° C. to 260° C. for 0.1 to 48 hours;
wherein the cross-linked fluororubber product produced according to the said production method has a dynamic friction coefficient of 0.1 to 0.4 in conformity to JIS K7125, P 8147, a surface roughness (Ra) of 1.5 to 4.0, and a surface roughness (Ry) of 10 to 25 both in conformity to JIS B-0601, and is formed into a HDD device stopper.

* * * * *